May 5, 1931.   A. E. RUTLEDGE ET AL   1,803,678
TRIP DEVICE FOR POWER SHOVELS
Filed June 5, 1926   2 Sheets-Sheet 1
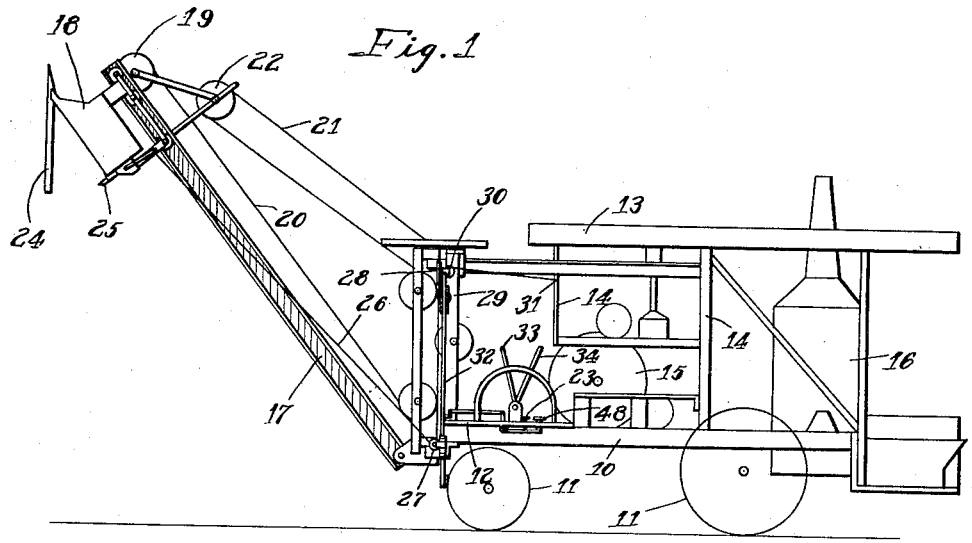
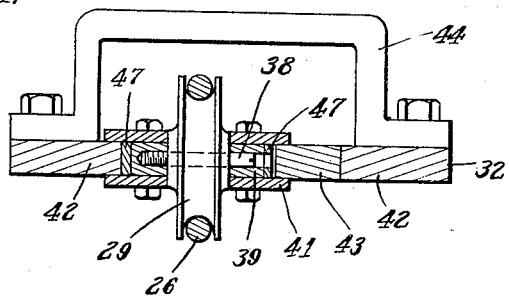
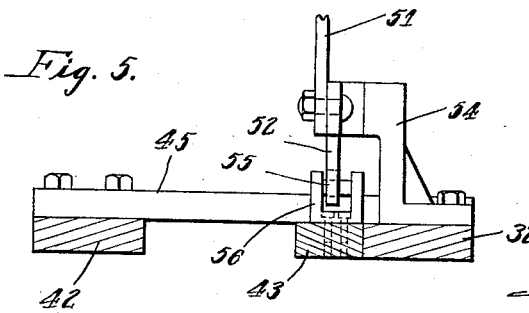
Inventors:
Arthur E. Rutledge
Edward J. Cleary
By Wilson & McCannia
Attys.

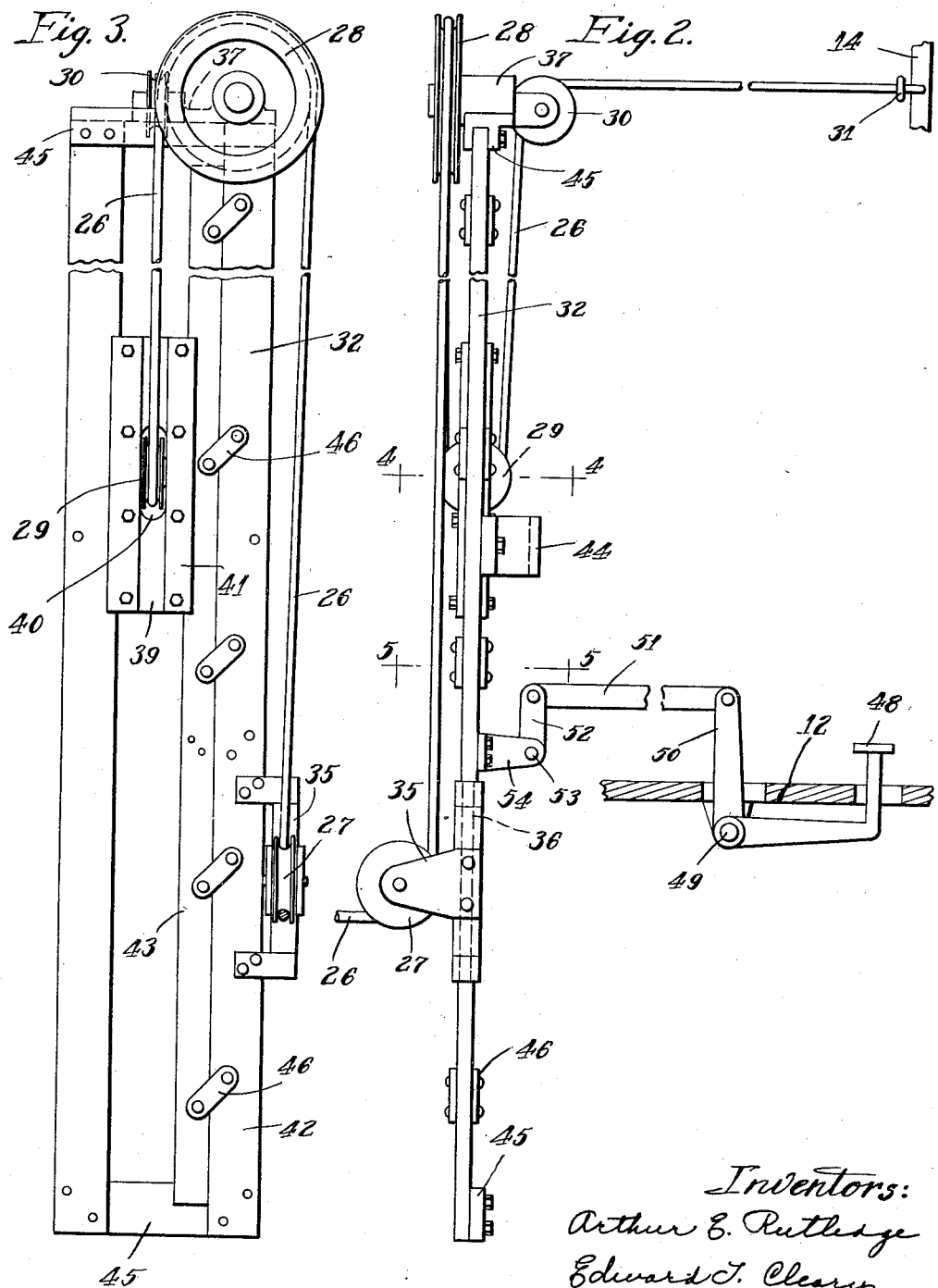

Patented May 5, 1931

1,803,678

UNITED STATES PATENT OFFICE

ARTHUR E. RUTLEDGE AND EDWARD T. CLEARY, OF ROCKFORD, ILLINOIS

TRIP DEVICE FOR POWER SHOVELS

Application filed June 5, 1926. Serial No. 113,913.

This invention relates to power shovels and is particularly concerned with the provision of a novel trip device for dumping the shovel.

The principal object is to provide a mechanical means for dumping the shovel which is under the control of the operator on the machine who also controls all of the other operations of the shovel, the thought being to enable dispensing with the need for an additional man to perform this function and avoid the necessity for team-work which was otherwise involved and which made the operation of the shovel necessarily slower because of an inability at all times to perform the operations in proper timed sequence. Besides this, there is also to be considered the matter of labor cost which is considerably reduced by the present improvement.

We are aware that the matter of dumping the shovel has heretofore been taken care of by other than mechanical means apart from direct manual operation, as, for example, by the use of an electric motor-operated mechanism. However, these electrical devices were objectionable in that their application was limited to certain types of power shovels and they could not be used on steam shovels without providing certain additional equipment involving prohibitive expense. Furthermore, the motor was usually mounted on the back of the shovel proper and its fastenings soon were knocked loose in the rough handling to which it was necessarily subjected in the ordinary use of the shovel. Frequently the motor was thrown completely out of commission when it happened to be submerged in water. There was also the difficulty in maintaining proper electrical connections with the motor as the trolley wheels on the shovel mounting seldom made good electrical contact on the boom by reason of the water and débris that accumulated on the tracks thereon with the shovel in service.

According to the present invention, we provide a mechanical means for dumping the shovel which is applicable to all types of power shovels with equal facility, is simple in construction, economical to manufacture, thoroughly practical in its application and operation, and will require practically no attention once it is installed. Briefly stated, the trip device embodies simply a slack take-up for the dump cable which, while it allows the shovel freedom of movement normally during the loading, the hoisting, and the swinging of the shovel toward the dumping point, is arranged to be held at any point in the range of movement of the shovel to communicate a pull on the cable to release the latch; the holding of the take-up, accompanied by the outward movement of the shovel, causes the cable to be pulled to release the latch. We prefer to provide a weighted pulley element operating in a vertical guide frame to gravitate toward the bottom as permitted by the amount of free slack in the cable, thus imposing a constant relatively light tension or drag on the cable throughout the range of movements of the shovel, and provide in connection with the weighted pulley a foot-operated means to brake the upward movement thereof in the outward movement of the shovel. The inner end of the cable is also attached to a stationary part of the machine framed within convenient reach of the operator so that the shovel may be dumped by hand when desired.

The invention is illustrated in the accompanying drawings, wherein—

Figure 1 is a more or less diagrammtic view of a steam shovel equipped with our novel trip device;

Fig. 2 is a side view of the trip device showing the means for foot pedal release or hand release of the latch to dump the shovel;

Fig. 3 is a front view of Fig. 2; and

Figs. 4 and 5 are horizontal sections on an enlarged scale taken on the lines 4—4 and 5—5 respectively of Fig. 2.

Throughout the views, the same reference numerals are applied to corresponding parts.

As stated above, the present invention is applicable to all types of power shovels with equal facility, that is, wherever the releasable latch of the shovel was otherwise ordinarily operated by a dump cable under the control of a special man. The latter had to time the pull of the cable in proper relation to the movement of the shovel controlled by the operator on the machine. This way of operating a power shovel, therefore, resolved itself into a matter of team-work on the part of the two men if there was to be any efficiency, and even with the best of cooperation between the two men there was bound to be a certain amount of delay or confusion which it is one of the objects of the present invention to eliminate. In other words, where everything is taken into consideration, it is preferable to have one man control if possible. This is made entirely practical by the present invention and it has been shown to be a fact that the output of the machine is greatly increased by reason of the present invention as all vexation and delay to the operator are eliminated. There is also a considerable saving in labor cost as one less attendant to a machine is required. The invention is herein illustrated as applied to a steam shovel although practically any other type would serve for the purposes of illustration. Furthermore, the type of scoop or shovel employed in connection with the machine is of relatively no importance and, while the present illustration shows the use of a skimmer scoop, a ditching scoop or any other type of shovel might be illustrated as the invention is applicable with equal facility to any type of shovel having a releasable latch or other means similar in function for dumping the same.

The machine illustrated comprises the usual frame 10 provided with the supporting and traction wheels 11 and affording a support for the operator's platform 12. The usual canopy 13 supported on uprights 14 shelters a winding drum 15, a steam boiler 16 and other appurtenances commonly provided on machines of the type referred to. A swingable boom 17 carries a shovel 18, commonly referred to as a skimmer scoop by reason of its being ordinarily operated horizontally with a crowding thrust. The sheave 19 at the outer end of the boom has a hauling cable 20 operating thereover and connected with the shovel to operate the same. The boom is arranged to be hoisted by a cable 21 operating over another sheave 22 and may be swung laterally in either direction by the operator bearing on the right or left hand side of a foot pedal 23 on the platform 12. The shovel has a dump bottom 24 arranged to open in the manner illustrated but normally held closed by a releasable latch 25 of any well known or preferred type, the particular one illustrated being of the cam and shaft type. The latch 25 has a dump cable 26 connected therewith arranged when pulled to release the latch to dump the shovel. As stated above, the cable 26 was heretofore extended off to one side of the machine for manual operation. According to our invention, however, the cable is extended back alongside the boom to the machine where it is passed over the pulley 27 and thence over pulleys 28, 29, and 30 to one of the fixed uprights 14 of the frame 10 to be attached, as indicated at 31. The pulleys 27, 28, 29, and 30 are all mounted in or on a frame 32 in a manner more fully described hereinafter. The frame 32, with the pulleys and other parts operating in connection therewith or connected thereto as will hereinafter appear, constitutes the trip device of our invention. The frame 32, as indicated in Fig. 1, may be mounted on the frame 10 of the machine at the front of the operator's platform 12 where a short span of the terminal end of the cable 26 will be within easy reach of the operator for purposes hereinafter mentioned. The operator on the platform also has levers 33 and 34 under his control for the hoisting of the boom in unloading and the hauling of the shovel in loading. These levers as is well known are arranged when thrown forward to cause the hoisting of the boom or the hauling of the shovel on its outward movement and when thrown to the rear are arranged by suitable brake connections with the hoisting and hauling drums to hold the parts in any desired position.

The pulley 27, previously referred to, is mounted on a bracket 35 pivoted, as shown at 36, near the lower end of the frame 32. In this way it is disposed as near as possible to the horizontal and vertical axes about which the boom 17 is arranged to swing. Consequently, there is less feeding in and out of the cable than would otherwise be the case and the overall length of the frame 32, as will appear later, is kept to a minimum. The pivoting of the pulley bracket keeps the pulley 27 always parallel with the boom and there is no chance of the cable running off the pulley. The pulley 28 is mounted on a bracket 37 on the top of the frame 32, the bracket 37 serving also to provide a mounting for the pulley 30. The pulley 29 is mounted on a rod 38 in a weight element 39 which has an opening 40 therein for the reception of the pulley 29. The weight 39 has plates 41 fastened to the opposite sides thereof to lap over the one side 42 of the frame 32 and over a bar 43 interposed between the other side 42 of the frame 32 and the weight element. The side members 42 of the frame are rigidly spaced by a transverse bracket 44 at an intermediate point of the length of the frame and by the cross members 45 at the top and bottom, the upper cross member being a part of the bracket 37 previously mentioned. The bar 43 is pivoted to the side member 42 of the frame 32 on a plurality of links 46 so that upward movement of the bar 43 swings the same in parallelism with the side members 42 about the links 46 as crank arms to clamp or bind the weight 39 between the side member 42 and the bar 43. Frictional brake lining, indicated at 47, may be provided on the opposite faces of the weight 39 to avoid a metal to metal contact and afford necessary friction to hold the weight against movement. The movement of the bar 43 may be produced by a depression of a foot pedal 48 pivoted at 49 on the platform 12. The pedal 48 has a bell crank form to provide an arm 50 for connection with a link 51 extending forwardly to the frame 32 for connection with another bell crank 52 pivoted at 53 on a bracket 54 mounted on the frame 32. The bell crank 52 has a sliding pivotal connection at 55 with a bracket 56 fixed to the bar 43. In operation it will be clear that a depression of the pedal 48 will raise the bar 43 and the latter by reason of the link connections 46 will confine the weight 39 against movement between itself and the other side of the frame 32.

The weight element 39, except when held by the operation of the bar 43, as just described, will gravitate toward the bottom of the frame 32 an extent afforded by the amount of slack in the cable 26. The amount of slack occurring in the cable is represented by the loop of cable occurring between the pulleys 28 and 30 wherein the pulley 29 is received. In the outward movement of the shovel 18, it is obvious that this loop will be shortened and consequently the weight element 39 will be raised. If, however, the foot pedal 48 is depressed to hold the weight element 39 and with it the pulley 29, a pull is communicated on the cable 26 and the latch 25 is released to dump the shovel. In other words, the shovel by its outward movement causes the release of its latch the moment the slack take-up weight 39 is held against movement. Obviously the operation of the latch may be brought about at any point in the range of movement of the shovel. It is a simple matter for the operator to time the depression of the foot pedal 48 in proper relation to the movement of the shovel so that the load is not likely to be dumped at the wrong time. After the dumping, the bottom may be thrown back into position by a quick back and forth movement of the shovel, as is well known in this art.

When it is desired to dump the shovel without necessarily having the shovel moving outwardly on the boom as, for example, where the shovel has reached the limit of its stroke, the pedal 48 may be depressed to hold the weight 39 and the cable 26 may be pulled by hand. In fact, if the cable is given a sudden jerk, the latch may be operated without necessarily holding the take-up weight, in which case the inertia of the weight comes into play in an obvious manner. A span of cable at the terminal end thereof is arranged within convenient reach of the operator on the platform to facilitate the method of operation just referred to.

It is believed that the foregoing conveys a clear understanding of the objects prefaced above, it being noted however, that the particular construction disclosed herein is merely for illustrative purposes, and that changes might be made in the construction and arrangement of parts without departing from the spirit and scope of the invention as expressed in the appended claims.

We claim:

1. In a machine of the character described, a frame, a boom extending therefrom, a movable shovel carried thereby having a releasable latch for dumping the same, a dump cable connected with said latch and extending to said frame and connected to a part thereof, there being a certain amount of slack in said cable to afford a predetermined range of movement for said shovel, a pulley in a loop of slack cable arranged to have translational movement as the cable slack is used in the movement of said shovel, a slidable bearing member for said pulley, a guide whereon said bearing member is arranged to move, and means cooperating directly with the guide and equally effective in the movement of the bearing in either direction for frictionally braking the movement of said bearing on said guide at any point in the travel thereof.

2. In a machine of the character described, a frame, a boom extending therefrom, a movable shovel carried thereby having a releasable latch for dumping the same, a dump cable connected with said latch and extending to said frame and connected to a part thereof, there being a certain amount of slack in said cable to afford a predetermined range of movement for said shovel, a pulley in a loop of slack cable, a weight providing a mounting for said pulley, an upright guide for said weight whereon the same is arranged to gravitate toward the bottom depending on the amount of slack existing in the cable due to the position of the shovel, and means cooperating directly with the guide arranged to frictionally brake the movement of said weight at any point in its upward travel in the outward movement of said shovel whereby to operate said latch to dump the shovel.

3. In a machine of the character described, a frame, a boom extending therefrom, a moveable shovel carried thereby having a releasable latch for dumping the same, a dumb cable connected to said latch extending therefrom to said frame and attached to the latter at a fixed point thereon, there being a certain amount of slack in said cable to afford a certain range of movement for said shovel, a weight element suspended in a free loop of slack cable movable up and down as the cable slack is used in the movement of the shovel, said weight imposing a certain amount of drag on said cable, a portion of the length of said cable being exposed at said frame to be pulled manually to operate said latch, a guide frame having said weight operating therein, one side of said guide frame being arranged to move toward the weight element to clamp the same between it and the other side of the frame, and foot-operated means on said frame connected therewith to operate the same.

ARTHUR E. RUTLEDGE.
EDWARD T. CLEARY.